US012223187B2

(12) United States Patent
Das et al.

(10) Patent No.: US 12,223,187 B2
(45) Date of Patent: *Feb. 11, 2025

(54) SSD SUPPORTING DEALLOCATE SUMMARY BIT TABLE AND ASSOCIATED SSD OPERATIONS

(71) Applicant: Kioxia Corporation, Tokyo (JP)

(72) Inventors: Saswati Das, Milpitas, CA (US); Manish Kadam, Cupertino, CA (US)

(73) Assignee: Kioxia Corporation, Tokyo (JP)

( * ) Notice: Subject to any disclaimer, the term of this patent is extended or adjusted under 35 U.S.C. 154(b) by 92 days.

This patent is subject to a terminal disclaimer.

(21) Appl. No.: 18/195,565

(22) Filed: May 10, 2023

(65) Prior Publication Data

US 2023/0273734 A1 Aug. 31, 2023

Related U.S. Application Data

(63) Continuation of application No. 17/491,123, filed on Sep. 30, 2021, now Pat. No. 11,669,254.

(51) Int. Cl.
*G06F 3/06* (2006.01)

(52) U.S. Cl.
CPC .......... *G06F 3/0631* (2013.01); *G06F 3/0604* (2013.01); *G06F 3/0659* (2013.01); *G06F 3/0679* (2013.01)

(58) Field of Classification Search
CPC .... G06F 3/0631; G06F 3/0604; G06F 3/0659; G06F 3/0679; G06F 3/065061; G06F 11/1441; Y02D 10/00
See application file for complete search history.

(56) References Cited

U.S. PATENT DOCUMENTS

| 11,334,273 | B1 | 5/2022 | Ko | |
| 11,397,672 | B2* | 7/2022 | Ju | G06F 9/5016 |
| 2010/0274980 | A1* | 10/2010 | Stringham | G06F 11/1451 |
| | | | | 711/156 |

(Continued)

OTHER PUBLICATIONS

M. Ramakrishna, Jisung Kim, Woohyong Lee and Youngki Chung, "Smart dynamic memory allocator for embedded systems," 2008 23rd International Symposium on Computer and Information Sciences, Istanbul, Turkey, 2008, pp. 1-6, doi: 10.1109/ISCIS.2008.4717922 (Year: 2008).

*Primary Examiner* — Khoa D Doan
(74) *Attorney, Agent, or Firm* — FOLEY & LARDNER LLP

(57) ABSTRACT

The present invention is directed to an SSD that stores data in a plurality of regions of the SSD, each of the regions associated with a plurality of logical cluster addresses. The SSD also sets a deallocation status of each of the plurality of regions in a deallocate flag bitmap and sets a deallocation status of one or more sections of the deallocate flag bitmap in a deallocate summary table, wherein each of the one or more sections corresponds to more than one of the plurality of regions. In response to a shutdown or loss of power event, The SSD writes to non-volatile memory only sections of the deallocation flag bitmap with a predetermined deallocation status in the deallocate summary table. The SSD stores the deallocate flag bitmap is stored in a first volatile memory and stores the deallocate summary table is stored in a second volatile memory, different from the first volatile memory.

26 Claims, 7 Drawing Sheets

(56) References Cited

U.S. PATENT DOCUMENTS

| | | |
|---|---|---|
| 2015/0074335 A1 | 3/2015 | Matsudaira et al. |
| 2018/0095834 A1* | 4/2018 | Fernando ............ G06F 11/1425 |
| 2018/0203637 A1 | 7/2018 | Furuya |
| 2020/0081830 A1* | 3/2020 | Desai .................. G06F 12/0246 |
| 2021/0224002 A1 | 7/2021 | Zhou et al. |

* cited by examiner

SSD SUPPORTING DEALLOCATE SUMMARY BIT TABLE AND ASSOCIATED SSD OPERATIONS

CROSS-REFERENCE TO RELATED APPLICATION

This application is a continuation of U.S. application Ser. No. 17/491,123 filed on Sep. 30, 2021, the entire contents of which are incorporated herein by reference.

FIELD OF INVENTION

This invention generally relates to Solid State Drives (SSDs) implementing techniques employing an innovative deallocate summary bit table, data access and power loss protection/recovery functionality associated therewith.

BACKGROUND OF THE INVENTION

SSDs are surpassing traditional spinning disk hard drives due to the performance benefits of SSDs. SSDs provide a number of advantageous, particularly in reduced latency that make SSDs advantageous for use in data centers and other applications that require large and rapid data movement. SSDs are even replacing traditional spinning disk hard drives in personal computers.

In order to manage the data stored on SSDs, an SSD needs to keep track of certain metadata that allows it to know what changes have been made to the data stored on the SSD and where that data has been stored. In order to reduce latency and keep throughput high, metadata is stored in volatile memory such as DRAM rather than the non-volatile, but slower, NAND flash. However, during a power loss event, it is critical to store this metadata and any other data in the volatile memory into non-volatile, as part of a process called "hardening," in order to preserve the data.

If the metadata is lost, the SSD will not be able to determine what data is stored where or the status of that data, and as a result may not allow any access to any data. This includes a loss of access to all of the data stored in the non-volatile memory even if the data was stored well prior to the loss of power event.

Further this metadata is leveraged during read and write commands as well as during other processes such as garbage collection. Accessing the metadata in association with these commands and processes add a certain amount latency based on the frequency and depth of access required. For example, if the data is stored in fast but low volume memory such as SRAM or DTCM, the associated latency is minimal. However, due to cost and technological constraints, such memory can only hold a small amount of data. Alternatively, data can be stored in NAND or other non-volatile memory capable of cheaply providing a large amount of storage, but with relatively slow access speeds compare to fast volatile memory like SRAM and DTCM. Slower volatile memory like DRAM can be used to balance the benefits and disadvantages associated with faster volatile memory, such as SRAM, and non-volatile memory such as NAND.

However, for the most frequently accessed metadata, it is desirable to store it in the fastest memory to access memory possible to provide the best performance for consumers. Yet, as SSDs continued to expand in size, more and more corresponding metadata is required. The following table shows the size of deallocate flag bitmap, discussed in more detail herein, based on the size of the corresponding NAND storage.

| Size of NAND Storage | Size of Corresponding Deallocate Flag Bitmap |
|---|---|
| 1 Terabyte | 1 Megabyte |
| 2 Terabyte | 2 Megabyte |
| 4 Terabyte | 4 Megabyte |
| 8 Terabyte | 8 Megabyte |
| 16 Terabyte | 16 Megabyte |

As even entry level commercial SSD are readily available in size of two terabytes or more, and data center storage drives dwarfing consumer drives in capacity, it has become impossible to effectively store critical metadata, such as the deallocate flag bitmap table in fast volatile memory such as SRAM or DTCM. As a result, SSDs have increased latency with increased size. Likewise, saving larger amounts of metadata, managed according to traditional principles take longer and longer during the critical time after power loss and then again on boot up. This not only increases the risk failing to safely shutdown after a power loss event, which could even render the SSD inoperable, but also increase boot latency, which is one of the most noticeable forms of latency to users as it delays the time before a user can begin using the SSD.

Accordingly, there is a long felt and unmet need for SSDs that better manage the amounts of metadata required for larger and larger SSDs. Likewise, there is a long and unmet need to more efficiently access critical metadata to avoid latency in read and write commands, and other processes. Further, there is another long and unfelt need for SSDs with refined power loss protection operation that reduce the risk of total device failure. Moreover, there is a long an unmet need for SSDs that reduce bootup latency and improve user experience.

BRIEF DESCRIPTION

A method manages an SSD according to certain embodiments of the presentation invention that require storing data in a plurality of regions of the SSD, each of the regions associated with a plurality of logical cluster addresses; setting a deallocation status of each of the plurality of regions in a deallocate flag bitmap; setting a deallocation status of one or more sections of the deallocate flag bitmap in a deallocate summary table, wherein each of the one or more sections corresponds to more than one of the plurality of regions; and in response to shutdown or loss of power, writing to non-volatile memory only sections of the deallocation flag bitmap with a predetermined deallocation status in the deallocate summary table, wherein. the deallocate flag bitmap is stored in a first volatile memory; and the deallocate summary table is stored in a second volatile memory, different from the first volatile memory.

In some embodiments, the predetermined allocation status indicates a section is dirty.

In certain embodiments, each deallocation status of each of the one or more sections of the deallocate summary is a two-bit status.

In more embodiments, the method also includes updating the deallocation status of a region of the plurality of regions in response to one of a deallocation command, a beginning of a background deallocation process for the region, or a completion of the background deallocation process for the region.

In some embodiments, the method also updates the deallocation status of a section comprising the region in response to updating the deallocation status of the region.

In yet more embodiments, the first volatile memory is DRAM.

In some embodiments, the second volatile memory is SRAM or DTCM.

According to some embodiments, the method also sets an entry in a deallocate flag address pointer table based on the deallocation status of a section of the one or more sections of the deallocate flag bitmap corresponding to the entry.

In certain embodiments, the method sets an entry in a deallocate flag pointer address table based on the deallocation status of a subset of a plurality of regions corresponding to the entry.

In some embodiments, the method stores an entry in a deallocate flag pointer address table, wherein the entry is either a valid pointer or a predetermined value based on the deallocation status of a section, associated with the entry, of the one or more section of the deallocate flag bitmap; and in response to a restoration of power event, loads from the non-volatile memory only sections of the deallocate flag bitmap associated with a valid pointer.

According to certain embodiments of the present invention, an SSD comprises at least non-volatile memory comprising a plurality of non-volatile memory dies; a first volatile memory; a second volatile memory; and a controller. The controller is configured to store data in a plurality of regions of the SSD, each of the regions associated with a plurality of logical cluster addresses, the plurality of logical cluster addresses each associated with a media cluster address of the plurality of non-volatile memory dies; set a deallocation status of each of the plurality of regions in a deallocate flag bitmap; set a deallocation status of one or more sections of the deallocate flag bitmap in a deallocate summary table, wherein each of the one or more sections corresponds to more than one of the plurality of regions; and in response to shutdown or loss of power, write to non-volatile memory only sections of the deallocation flag bitmap with a predetermined deallocation status in the deallocate summary table. The deallocate flag bitmap is stored in a first volatile memory and the deallocation summary table is stored in a second volatile memory which is different from the first volatile memory.

In some embodiments, the predetermined allocation status indicates a section is dirty.

In certain embodiments, each deallocation status of each of the one or more sections of the deallocate summary is a two-bit status.

In some embodiments, the controller is further configured to update the deallocation status of a region of the plurality of regions in response to one of a deallocation command, a beginning of a background deallocation process for the region, or a completion of the background deallocation process for the region.

In certain embodiments, the controller is further configured to updating the deallocation status of the section comprising the region in response to updating the deallocation status of the region.

In yet more embodiments, the first volatile memory of the SSD is DRAM.

In some embodiments, the second volatile memory of the SSD is SRAM or DTCM.

In certain embodiments of the present invention, the controller is further configured to set an entry in a deallocate flag address pointer table based on the deallocation status of a section of the one or more sections of the deallocate flag bitmap corresponding to the entry.

In yet other embodiments of the present invention, the controller is further configured to set an entry in a deallocate flag pointer address table based on the deallocation status of a subset of a plurality of regions corresponding to the entry.

In still other embodiments of the present invention, the controller is further configured to store an entry in a deallocate flag pointer address table a deallocate flag pointer address table, wherein the entry is either a valid pointer or a predetermined value based on the deallocation status of a section, associated with the entry, of the one or more section of the deallocate flag bitmap; and in response to a restoration of power event, load from the non-volatile memory only sections of the deallocate flag bitmap associated with a valid pointer.

DETAILED DESCRIPTION

Figure 1:
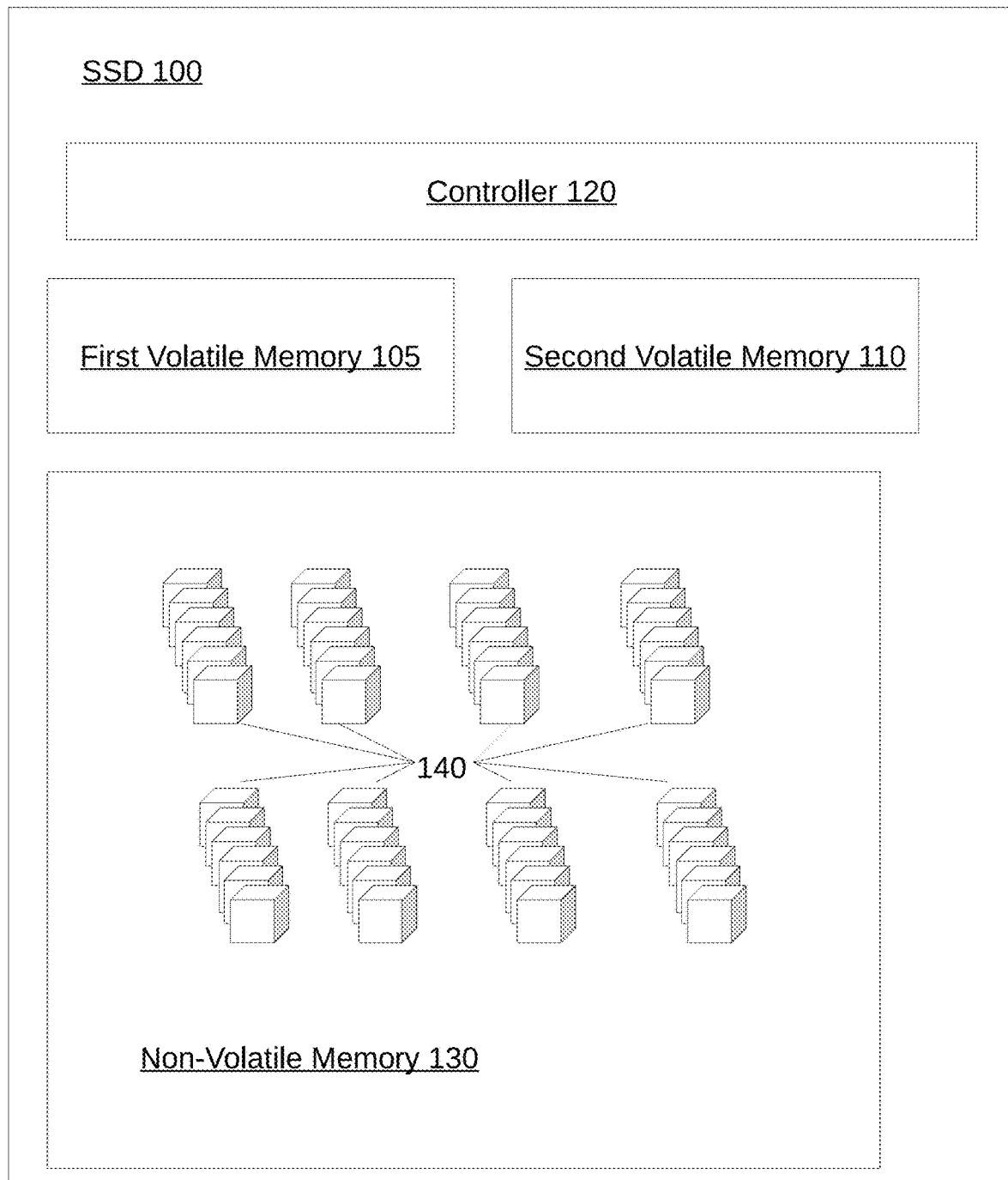
FIG. 1 illustrates an SSD according to certain embodiments of the present invention.

FIG. 1 illustrates an SSD 100 in accordance with certain embodiments of the present invention, which includes a number of different types of memories.

SSD 100 can include first volatile memory 105, which can be any suitable high-speed volatile memory such as SRAM and DTCM without departing from the spirit of the invention.

SSD 100 also includes a second volatile memory 110. Second volatile memory 110 can be volatile memory such as DRAM. Notably, second volatile memory 110 is slower to access than first volatile memory 105. However, second volatile memory 110 generally has a larger storage capacity than first volatile memory 105.

Additionally, SSD 100 may include a non-volatile memory 130. Non-volatile memory 130 operates as the bulk storage component of SSD 100 and is designed to store data long term. In certain embodiments of the present invention, main non-volatile memory 130 is NAND flash memory which comprises a plurality of NAND dies 140. Data is written to the various dies 140. A skilled artisan would understand that a number of other main volatile memory types can be used without departing from the spirit of the invention.

To manage the data stored on SSD 100, SSD 100 has a controller 120. Controller 120 can be hardware, firmware, or a combination thereof. Controller 120 uses both first volatile memory 105 and second volatile memory 110 to store metadata regarding the data stored in non-volatile memory 130. This allows controller 120 to efficiently manage of all of the operations of the SSD such as read and write data access commands, deallocation, garbage collection, power loss protection and recovery, and more. A skilled artisan would understand that the foregoing are examples and not meant to limit the possible operations of the controller.

Non-volatile memory 130 addresses data storage locations within the non-volatile memory dies 140 using a Media Cluster Address (MCA). However, there are well-known limitations and reasons for not allowing host to write data or interact with the SSD 100 at such a granular level. Rather, SSD 100 uses Logical Cluster Address (LCA) for external interfacing. LCAs represent the smallest logical granularity of data from the host perspective. SSD 100 may employ a flash translation layer or other approach to effectively translate between LCAs and MCAs. For example, the flash translation layer may include a mapping table mapping LCAs to MCAs. A skilled artisan would be familiar with multiple approaches for doing so and would understand that any number of approaches can be implement to translate between MCAs and LCAs without departing from the spirit of the invention.

To better keep track of data and because certain operation cannot or should not carried out on an LCA by LCA granularity, LCAs are organized into regions in a mapping table. Generally, but not necessarily, a region comprises 64 LCAs. Regions in turn can be organized into sections of 1024 regions (sometimes referred to also as "zones").

It is important for controller 120 and SSD 100 as whole to keep track of various statuses of the data stored using LCAs. One such status is whether the region of data is currently deallocated, contains valid data, is in the process of deallocation, a mix of the foregoing statuses or other data regarding the deallocation process.

Controller 120 maintains and manages a deallocate flag bitmap. Each entry in the allocate flag bit map represents the deallocation status of one region in the mapping table. In certain embodiments of the invention the deallocation status is represented by two bits. The invention will be described herein as though it used two bits to represent that deallocations status of a region in the mapping table. However, a skilled artisan would understand that the deallocation status maybe represented by a different number of bits without departing from the spirit of the invention.

The regions in the deallocate flag bitmap are further organized into sections of generally, but not necessarily, 1024 regions. These regions correspond to the smallest granularity used at which metadata is tracked and written in non-volatile memory. These sections also correspond to the sections/zones of the mapping table.

Since the deallocate flag bitmap stores data on a region by region basis, even with two bits per region, this can easily result in multiple megabytes of data. As a result, the deallocate flag bit map, while essential to prevent improper data access (e.g. writing to or reading from a region that is not yet deallocated/unmapped or is being deallocated/unmapped in the background) and therefore constantly accessed, is limited to being stored in second volatile-memory 110 which has the capacity but at the cost of access latency. As SSDs continue to increase in capacity, this problem will only get worse.

According to certain embodiments of the present invention, SSD 100 also uses a deallocate summary table. The deallocate summary table represents deallocation status in a similar manner to the deallocate flag bitmap (e.g., via 2-bit entries). As a non-limiting example, an entry in the deallocate summary table may be 11b indicate that all of regions in the corresponding section have been deallocated or the section contains all ones in the corresponding region entries and can thus be abstracted. As another non-limiting example, an entry in the deallocate summary table may be 01b to indicate that a section is being deallocated/unmapped, has been partially deallocated/unmapped in the background or the target of background deallocation. As yet another example, an entry in the deallocate summary table may be 00 to indicate the section has not been deallocated or background deallocation (i.e. unmapping of the section) is complete. In this case, the section would store all zeros in each of its constituent region entries of the deallocate flag bitmap and thus can be summarized. In certain embodiments a value of 10b may not be used or reserved for special purposes. A skilled artisan would understand that the foregoing entry types are for illustrative purposes and do not limit the invention.

Since the entries in the deallocate summary table entries correspond to deallocate flag bitmap sections instead of LCA regions, the deallocate summary table is far smaller than the deallocate flag bitmap. As a result, the deallocate summary table can be easily stored in the first volatile memory, such as SRAM or DTCM, and provide very low latency access to the metadata contained therein. A comparison between deallocate flag bitmaps and deallocate summary tables using two-bit entries is illustrated in the following table:

| NAND Storage | Corresponding Deallocate Flag Bitmap | Corresponding Deallocate Summary Table |
| --- | --- | --- |
| 1 Terabyte | 1 Megabyte | 1 Kilobyte |
| 2 Terabyte | 2 Megabytes | 2 Kilobyte |
| 4 Terabyte | 4 Megabyte | 4 Kilobyte |
| 8 Terabyte | 8 Megabyte | 8 Kilobyte |
| 16 Terabyte | 16 Megabyte | 16 Kilobyte |

In some embodiment of the present invention, controller 120 also uses a Deallocate Flag Physical Address Table (DFPAT) to store pointers to clean version of deallocate flag bitmap sections in non-volatile memory 130 because as explained herein, its entries also correspond to sections, not regions, of the deallocate flag bitmap. Deallocate flag bitmap sections (comprising the entries for each region contained therein) are, from time to time, stored in non-volatile memory 130 because the deallocate flag bitmap sections represent the status of data in non-volatile memory 130. Thus, this data will need to be stored even when the volatile memory loses power. Yet, as explained above this metadata is also stored in second volatile memory 110. The data in second volatile memory 110 is the most up to date and leveraged by controller 120 during operation of SSD 100. Periodically, this data is written or "flushed" to NAND to ensure its survival and so that it can be loaded back to second volatile memory 110 when power is restored. Metadata that has been changed in second volatile memory 110 but not yet flushed to non-volatile memory 130 is considered "dirty" whereas data that is that has not been updated or altered compared with the data in non-volatile memory 130 is considered "clean." The controller 120 may—keep track of dirty section using a bit flag or another suitable mechanism. Since SSDs shuffle data as part of a variety process, such as garbage collection or to ensure the life span of the SSD, the DFPAT maintains pointers to the location of deallocate flag bitmap sections so they can be updated by controller 120 during operation of the SSD.

Figure 2:
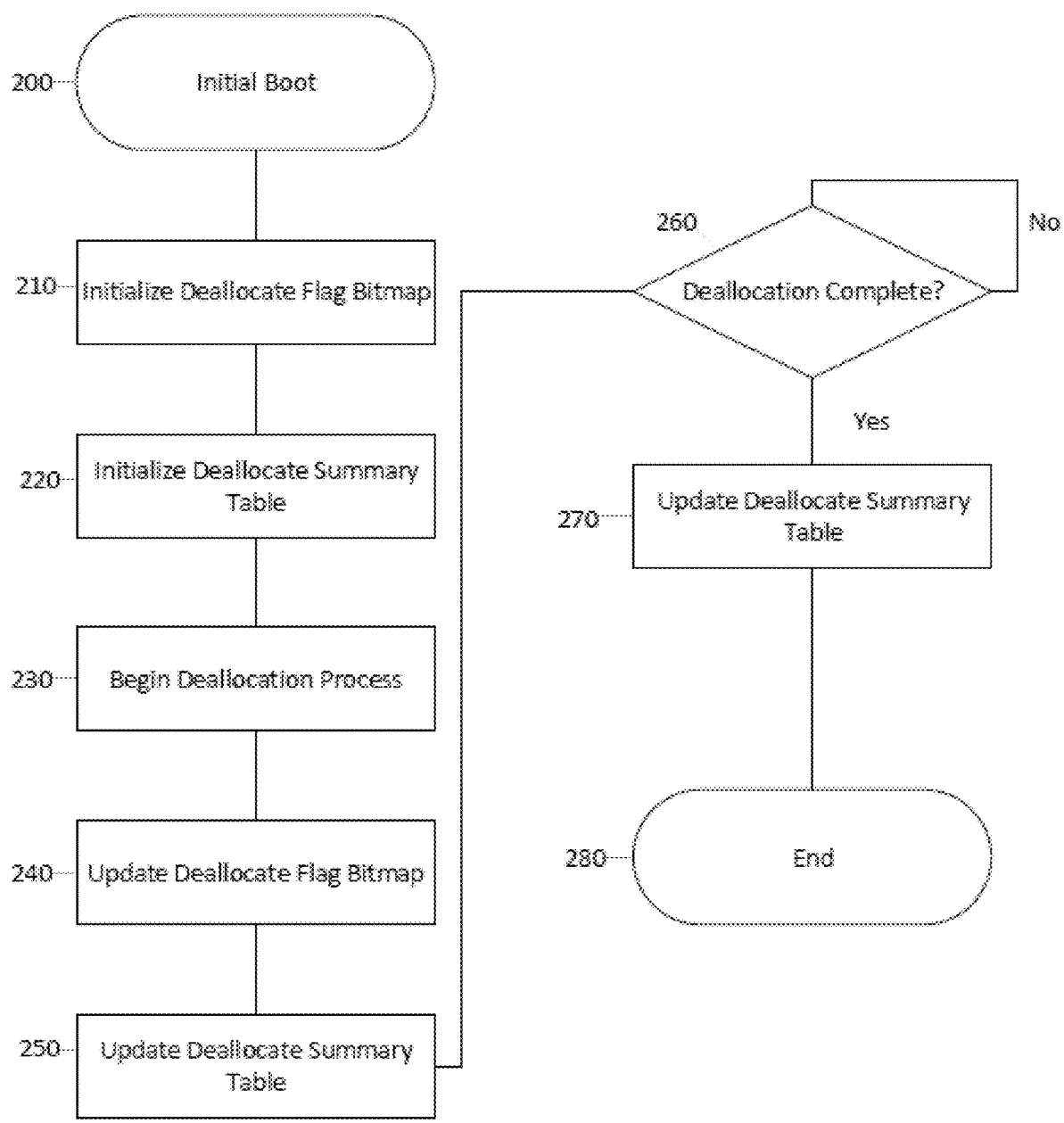
FIG. 2 illustrates a process of managing certain metadata in accordance with certain embodiments of the present inventions.

FIG. 2 illustrates a process of managing metadata in accordance with certain embodiments of the present invention.

The process begins at Step 200 with the initial boot of the SSD. At this point the initial set procedure begins and place the SSD in condition for use. A skilled artisan would understand that certain steps described herein do not necessarily have to occur in the illustrated order and can occur concurrently or in a different order than illustrated.

At Step 210 the deallocate flag bit map is initialized, which can include the loading of default values for each entry.

At Step 220 the deallocate summary table is also is initialized, which can also include the loading of default values for each entry. After step 220 and other essential metadata is initialized and loaded to the correct volatile memory, the SSD is ready for operation and begin to receive commands.

Eventually, at Step 230, the SSD will begin the deallocation process. When the SSD receives a deallocate command from the host. The command from the host triggers foreground deallocation. As part of the foreground deallocation, the SSD will change to the deallocated flag bitmap and the deallocate summary table corresponding to regions associated with the deallocation command as part of command processing, which are set to indicate that the regions are going to be deallocated in response to the command from the host.

It should be noted that when a deallocate command is received from a host, the controller may send a deallocation status completion to the host while utilizing a deallocate flag bitmap (DFB) to manage the processing of the deallocation of the mapping table entry in background within the SSD.

Next, as part of back ground deallocation, as regions are deallocated at Step 240 entries in the deallocate flag bitmap are updated to reflect the current status of the associated regions in the mapping table. Step 240 is an ongoing process that proceeds through regions or even sections until the requisite space is deallocated.

As the first entries are updated in Step 240, in Step 250, the entry in the deallocate summary table corresponding to the section containing the regions being deallocated in step 240 is changed, if not already so set, to indicated that deallocation is in progress.

At Step 260, it is checked if background deallocation (i.e. unmapping of the regions) has finished. This step may take a variable amount of time. Depending on the deallocate summary table and deallocate flag bitmap bits set during the processing of the deallocate command, background deallocation may need to process a number of regions as big as the whole drive could be unmapped or as little as just a single region could be unmapped.

Once deallocation is complete, in Step 270, the deallocate summary table is updated to reflect the final status of the section(s) subject to the deallocation process.

Finally, in Step 280, the process ends and the SSD will proceed to operate normally until host again issues a deallocate command and the process returns to Step 230.

Figure 3:
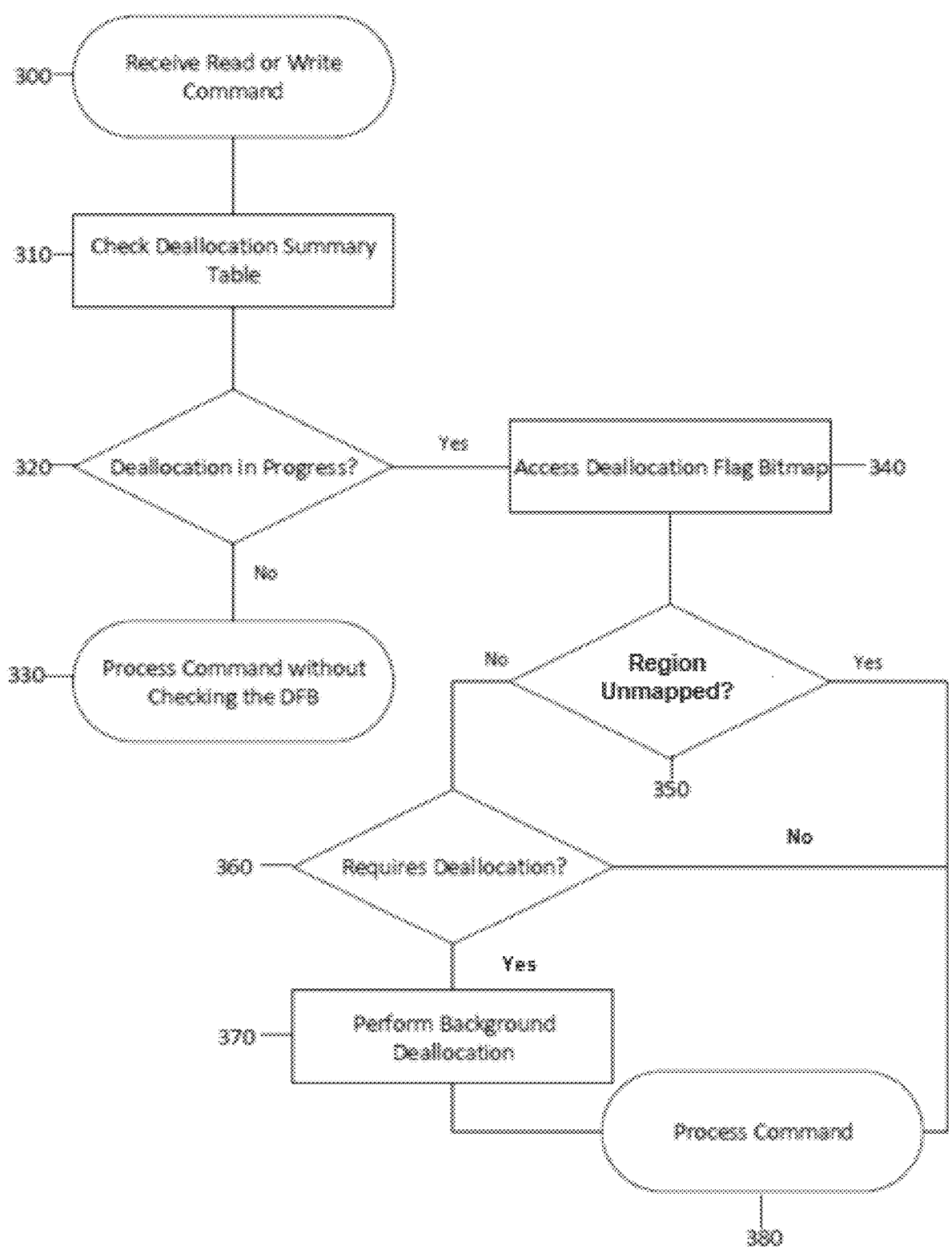
FIG. 3 illustrates the process of handling certain data access commands according to certain embodiments of the present invention.

FIG. 3 illustrates a method of handling data access commands according to certain embodiments of the present invention.

At Step 300 the SSD receives a read or write command from a host. The command will seek to write or read to particular LCAs. A skilled artisan would understand that the commands may theoretically target any number of LCAs ranging for a single LCA to entire zones without departing from the spirit of the invention. The controller of the SSD in turn parses and processes the command.

At Step 310, the controller checks the deallocation summary table to determine the deallocation status of the sections associated with the command. Since, unlike the traditional deallocate flag bitmap, the deallocation summary table can be stored in fast volatile memory, like SRAM or DTCM, instead of main and slower volatile memory, such as DRAM, there is very little latency associated with accessing the deallocate summary table as part of processing each command.

At Step 320, the process will take different paths depending on the deallocation status. If deallocate summary table entry shows that the section has either been fully unmapped, the region has not been allocated at all, background deallocation is complete, or the like, then the process proceeds to step 330.

In Step 330, the data access command is processed. Notably, the data access command is processed without having to access the deallocate flag bitmap, which requires at least one access of slower volatile memory such as DRAM. As a result, the command is processed faster than according to traditional approaches and reduces the latency of the data access command in specific circumstances.

Additionally, in some embodiments of the present invention, if the data access command is a read command, at Step 330 predetermined data may be sent in response to the command. For example, if the deallocated summary table indicates the corresponding section(s) has been fully deallocated, a predetermined response of all 0s, or another predetermined response, is sent to the host in response to read command. Here, because the deallocate summary table provides high level metadata, the SSD can respond to the read command without accessing the deallocate flag bitmap, the mapping table, or even the actual requested data in NAND. These creates a significant improvement in the amount of time and resources are needed to process certain read commands.

Write commands in the same circumstances will similarly avoid needing to access the deallocate flag bitmap in the slower volatile memory. Thus, a number of write commands will achieve lower latency in SSDs employing the deallocate summary table than with traditional approaches. This way by accessing the Deallocate Summary table residing in fast volatile memory, SSDs will be able to achieve significant improvement read and write performance in workloads which does not contain trim commands.

However, if background deallocation is in progress, the deallocate summary table shows the regions corresponding to the section are in a mixed state, some are deallocated and other are not, then the command will be process according to traditional approaches starting with Step 340. Regions associated with section may have mixed states because the section has been partially deallocated or deallocation is in progress.

At Step 340, because the deallocate summary table cannot be used to determine the status of a specific region, the SSD will need to access the deallocate flag bitmap to properly process the commands.

At Step 350, using the deallocate flag bitmap, the deallocation status of a region(s) is checked if it has been already unmapped. If so, the data can be retrieved or written to that region without more work and this portion of the command can be processed without issue.

However, if the region has not been unmapped, at Step 360 there is a check to see if the region should be unmapped first (e.g., because of a host deallocate command is issued on the region).

If the region does not have to be unmapped then no additional work has to be done for that region until the command is processed in step 380.

On the other hand, if the region still has to be unmapped, the process moves to Step 370 and perform background deallocation. After background deallocation is complete, the command can be processed in step 380.

The above examples, particular Step 340-380 are illustrated in the context of a single region. However, a person of ordinary skill in the will understand that some steps, such as steps 340, 350, and 360, may need to be performed for all of the region that associated with the data access command before the command can be processed in Step 380. Likewise, a skilled artisan would understand certain step can be done for different regions in parallel or concurrently.

Further, it should be noted that when a deallocate command is received from a host, the controller may also update an invalidity bitmap corresponding to one or more regions of a mapping table. The use of such an invalidity bitmap is detailed in U.S. patent application Ser. No. 17/491,156 filed on Sep. 30, 2021 entitled "Validity Table for Solid State Drives." The contents of the aforementioned application are expressly incorporated herein in their entirety as if they were entirely reproduced here.

Figure 4:
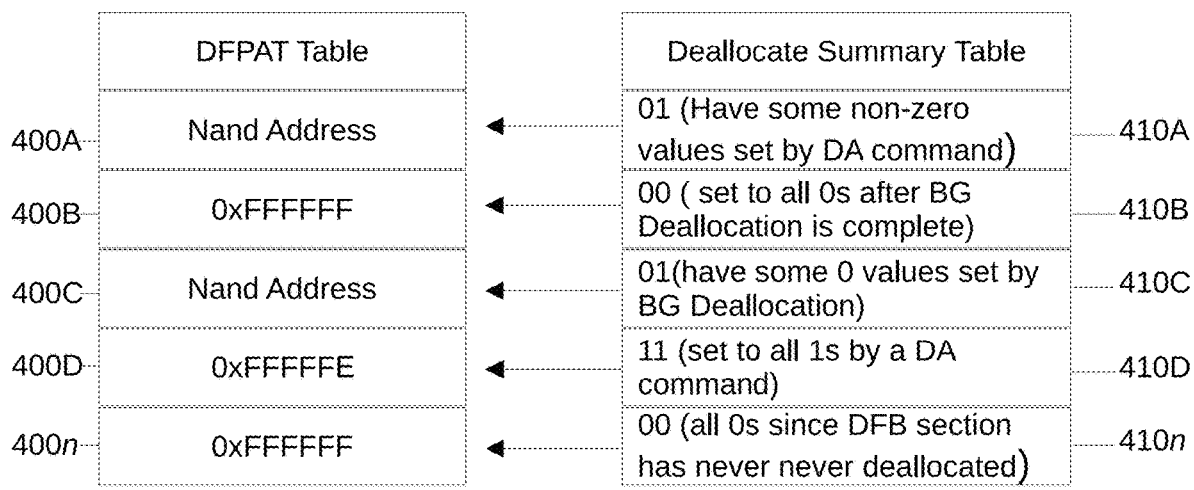
FIG. 4 illustrates the relationship between certain types of metadata in accordance with certain embodiments of the present invention.

FIG. 4 illustrates a new DFPAT table and its relationship with the deallocate summary table in certain embodiments of the present invention.

The new DFPAT table is used either in conjunction with the new deallocate summary table or can be employed as a standalone improvement. The DFPAT table has entries 400A-400n that correspond to sections of the deallocate flag bitmap. In traditional designs, a DFPAT would store pointers, in each entry, to NAND that store a particular section of the deallocate flag bitmap. As a result, regardless of the underlying data, the DFPAT had unique pointers for each corresponding section of the deallocate flag bitmap. Further, for any operation of the SSD that accessed the DFPAT, such as retrieving section(s) of deallocate flag bitmap on boot up or storing those same section in response to a loss of power event, the SSD would then have further access the much slower NAND or similar memory for each case regardless of whether this data could summarized in more efficient ways.

The new DFPAT table does not store exclusively unique pointer entries. Rather, some entries will contain predetermined entities that represent states of the corresponding section of the deallocate flag bitmap. For example, if the deallocation summery table shows that the section corresponding to entry 410a has mixed data, where some, but not all, data has been deallocated, the DFPAT contains a traditional pointer to the hardened version of the section that is stored in NAND (or other forms of non-volatile memory). On the other hand, if the corresponding sections have uniformed data, for example the sections correspond to deallocate summary table entries 410B, D, and n then predetermined data is stored in the corresponding entries of the DFPAT 400B, D, and n. This predetermined data may take multiple forms because there can more than one style of uniformed data stored in a corresponding entry of the deallocate summary table. As a non-limiting example, 400D may indicate that uniformed data contains all ones because of a deallocation command. On the other hand, 400B will have different predetermined data to indicate the uniformed data is all zeros because deallocation is complete.

The predetermined values allows the SSD to determine the data corresponding to the section of the deallocate flag bit map without accessing.

The predetermined data can be a specific hexadecimal value. However, a skilled artisan would understand that other predetermined values and schemes can be employed without departing from the spirit of the invention. For example, a null or void value can act as the determined value. This, as explained herein, can provide a major advantage when booting up an SSD or when responding to a power loss event.

In some embodiments, the new DFPAT table can be updated based on the status of the deallocation summary table. In some other embodiments, the DFPAT table can act as a fully independent table. For example, it could be generated and updated in much the same manner as the deallocate summary table described above. In fact, a skilled artisan would understand that the new DFPAT can be employed in a wider variety of environments without departing from the spirit of the invention. For example, the new DFPAT can be used in an SSD that does not use the aforementioned deallocate summary table at all.

Figure 5:
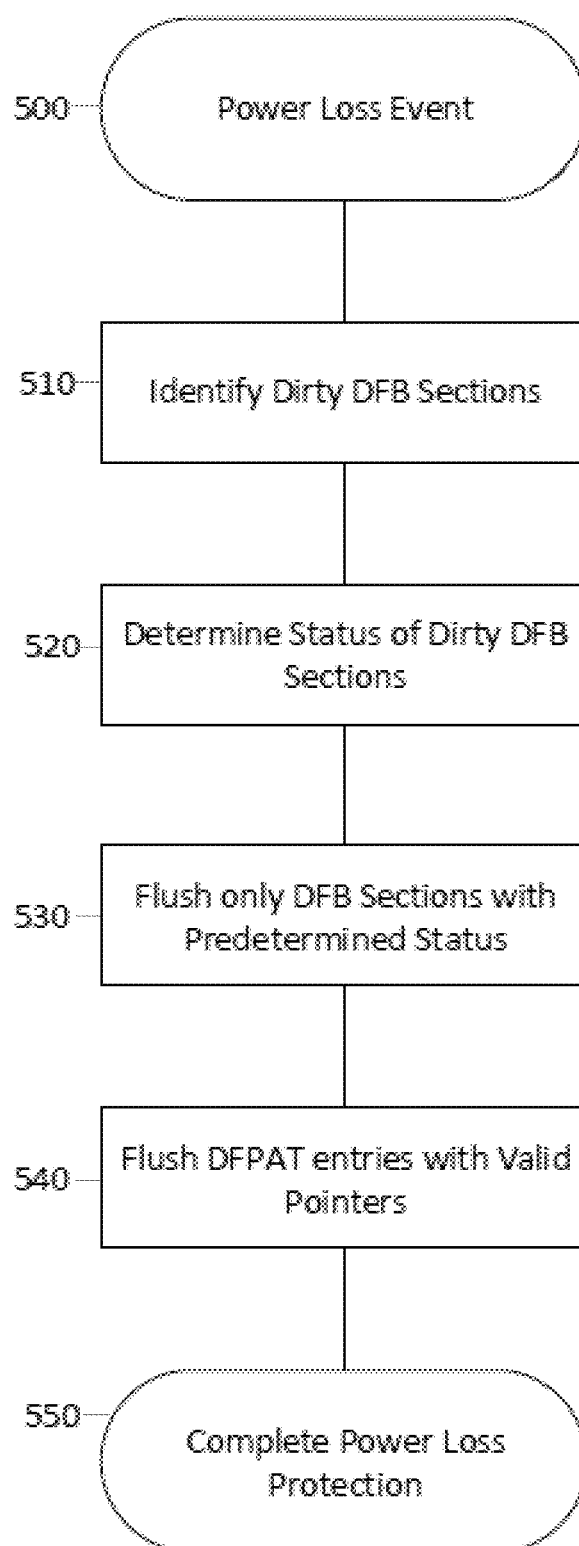
FIG. 5 illustrates the process for handling a power loss event according to certain embodiments of the present invention.

FIG. 5 illustrates the handling of a power loss event according to certain embodiments of the present invention.

The process begins in step 500 where a power loss event is detected. A skilled artisan would understand that a power loss event can be any number of different types of events where the SSD loses power, such as an unexpected disconnection from the power supply, loss of power to the host system, any other distribution of power that prevents the SSD from conducting normal operations without interruption due lack of power.

At step 510, the SSD identifies dirty sections of the deallocate flag bitmap (sections that have only been updated in volatile memory but not yet saved in NAND). In all designs, it crucial to save these sections, or at least maintain the data stored therein, because they contain the most up to date information about the status of the underlying NAND storage and without them, the underlying data may become worthless because it would not be possible to tell if the underlying data represents the most recent data or invalid data. In certain designs, dirty section are identified using a dirty flag bit associated with each entry in the DFPAT or deallocate summary table. However, a skilled artisan will know that there are many methods for keeping track of dirty sections, such as a in a separate list, without departing from the spirit of the invention.

At step 520, using either the DFPAT or deallocate summary table, the SSD determines the deallocation status of the dirty deallocate flag bitmap. In particular, at step 520, the SSD determines which dirty section of the deallocate flag bitmap have mixed data as opposed to sections that contain uniform data (e.g., all zeros because of background deallocation or all 11s as the result of deallocation command from the host). This can be done by identify the values, such as those shown in FIG. 4, in the corresponding entry of either the deallocate summary table or DFPAT that indicate a section has uniform data. However, a skilled artisan would understand that other techniques for identifying dirty sections with uniform data can be employed without departing from the spirit of the invention. For example, a "do not flush" bit could be part of the entry to indicate that a section does not need to be flushed using only a single bit value or the dirty flag bit could be set to indicated the section is not dirty even if it is because there is no need to save it just like there is no need to save other clean sections to the non-volatile memory.

Then in step 530, the dirty sections that have mixed data. For example, sections with a specific predetermined value, which indicated the corresponding deallocate flag bitmap section contains mixed data, in either the deallocate summary table, DFPAT, or both are flushed. That is, these section with mixed data are saved to flash and, if needed the DFPAT is updated with pointers to their location. The remaining dirty sections are not flushed because they contain uniform data that can reconstructed without a wasteful write to NAND. As explained above, a skilled artisan may implement other methods to achieve the same results. For example, anytime a deallocation summary table section is set to indicate uniform data stored in the corresponding section of the deallocate flag bitmap, the corresponding deallocate flag bitmap section can be marked clean or otherwise flagged not needing hardening. The end result would be the same. Namely, only section of the deallocated flag bit map with a specific predetermined value in the deallocation summary table indicating mixed data in the regions of the section are hardened during as part of the power loss protection process.

In some embodiments, the DFPAT table entries are updated with predetermined values in section corresponding to the dirty sections of the deallocate flag table containing uniform data after boot up. For example, this could be done if the power loss event occurs after the deallocate summary table has been updated but before the corresponding section of the DFPAT has been updated.

In some embodiments, in Step 540, only sections of the DFPAT with valid pointers are flushed as well so that the deallocate flag bitmap can be rebuilt upon restoration of power. In these embodiments the DFPAT table can be fully rebuilt using the deallocate summary table to populate the correct predetermined status for entries without a valid pointer to corresponding sections of the deallocate flag bitmap.

Once all of the desired dirty sections of the deallocate flag bitmap are flushed and safely stored in non-volatile memory, the SSD can complete the power loss process in step 550 and safely shutdown.

Although FIG. 5 is illustrated as a series of steps in a particular order, a skilled artisan would understand FIG. 5 does limit the inventions and that other orders are possible. For examples, section of the deallocate flag bitmap can processed one by one with each steps 510-540 being conducted for each section separately.

Figure 6:
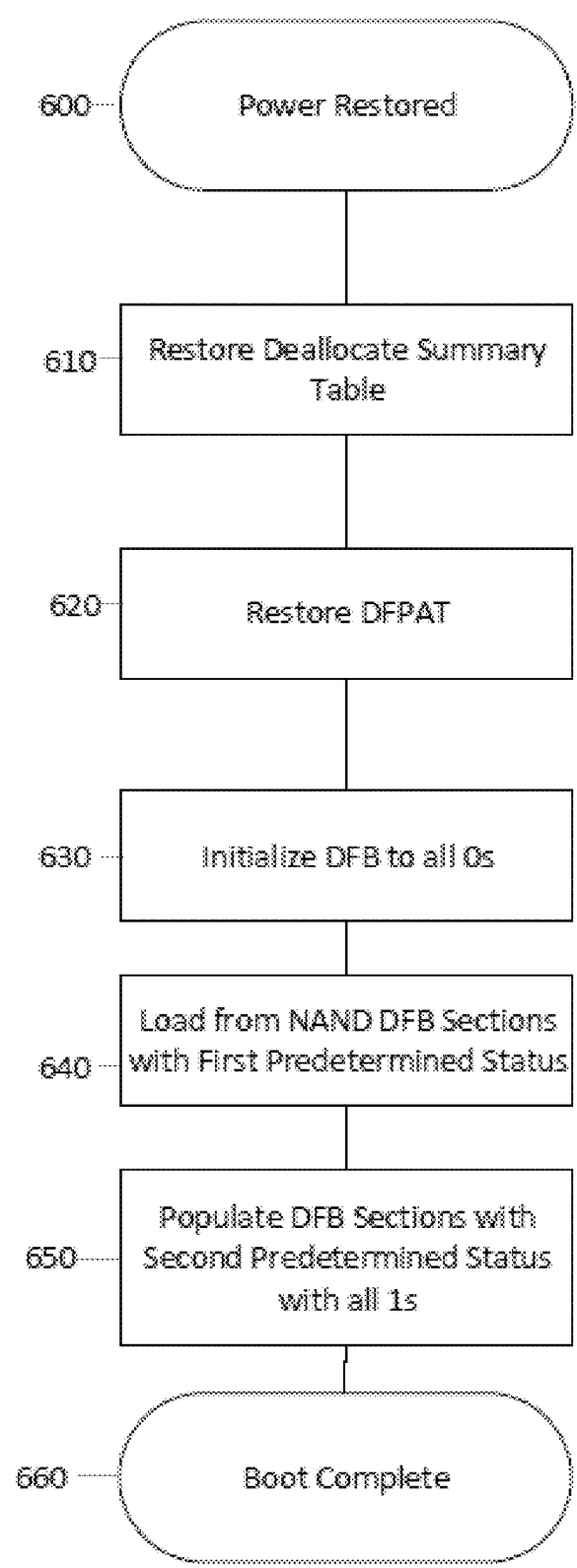
FIG. 6 illustrates certain aspects of the boot up process after power loss according to certain embodiments of the present invention.

FIG. 6 illustrates a boot up after power loss event process according to certain embodiments of the present inventions.

The process begins at step 600 when power is restored to the SSD.

At step 610, the SSD retrieves the deallocate summary table from the NAND and loads to volatile memory. Preferably, the deallocate summary table is stored in fast, but low capacity, volatile memory such as SRAM or DTCM, but, as skilled artisan would recognize, some advantages, including those associated with power loss protection and boot up after power loss, are achieved regardless of where the deallocate summary table is stored because it still reduces reads (e.g., not reading every section of the deallocate flag bitmap from NAND on boot up as explained herein) and writes (e.g., by not writing all dirty sections of the deallocate flag bitmap to NAND during power loss as explained above) to NAND.

Next in step 620, the DFPAT is restored as well. In some embodiments, the DFPAT may be loaded from NAND in its entirety. Alternatively, the DFPAT is only partially saved prior to power loss. For example, only entries corresponding to section containing mixed data contain valid pointer and the rest are empty.

If the DFPAT is not stored fully, it will need to be reconstructed. In some embodiments, the DFPAT is rebuilt using the deallocate summary table. Since the deallocate summary table indicates which sections of the deallocate flag bitmap contain mixed data and which contain uniform data, the DFPAT can have the missing entries filled in.

The missing entries are filled with predetermined values, such as those described with respect to FIG. 4 based on the entry in the deallocate summary table for the same section of the deallocate flag bitmap. As a result, not only is there less information to commit to non-volatile memory during power loss protection, but there is also less data to retrieve from NAND during the boot-up process which reduced the time require for the SSD to reboot after a power loss event.

Next, in Step 630, the deallocate flag bitmap is initialized in DRAM or other large capacity volatile memory. The deallocate flag may be set to all default values, such as 0s. However, a skilled artisan would understand that other methods to generate the deallocate flag bitmap can be used without departing from the spirit of the invention. For example, the deallocate flag bitmap may be loaded with all is or null values.

Then, in Step 640, sections of the deallocate flag bitmap with mixed data, as determined using the DFPAT or deallocate summary table, are retrieved from NAND using pointers stored in the corresponding section entry of the DFPAT.

Next, in Step 650, sections of the deallocate flag bitmap that contain uniform data different from the initial data (e.g., sections containing all is if the deallocate flag bitmap was initialized using all zeros) are set with the flag for each region.

As a result, the SSD only accesses the non-volatile memory to load sections of the deallocate flag bitmap that contain mixed data. The remaining sections can be reconstructed without the need to access NAND, apart for the initial retrieval of the deallocate summary bitmap. Thus, there is less latency and time required to reach Step 660 and complete the boot up process than with the traditional process that loads each section of the deallocate flag bitmap from non-volatile memory on every boot.

Although the process of FIG. 6 is illustrated in a particular order, a skilled artisan would understand this is for ease of understanding and other orders and designs exist without departing from the spirit of the invention. For example. The DFPAT may be retrieved before the deallocate summary table or the deallocate flag bitmap may have regions/sections populated with default values before the mixed data regions are loaded from the non-volatile memory, among other variations.

Figure 7:
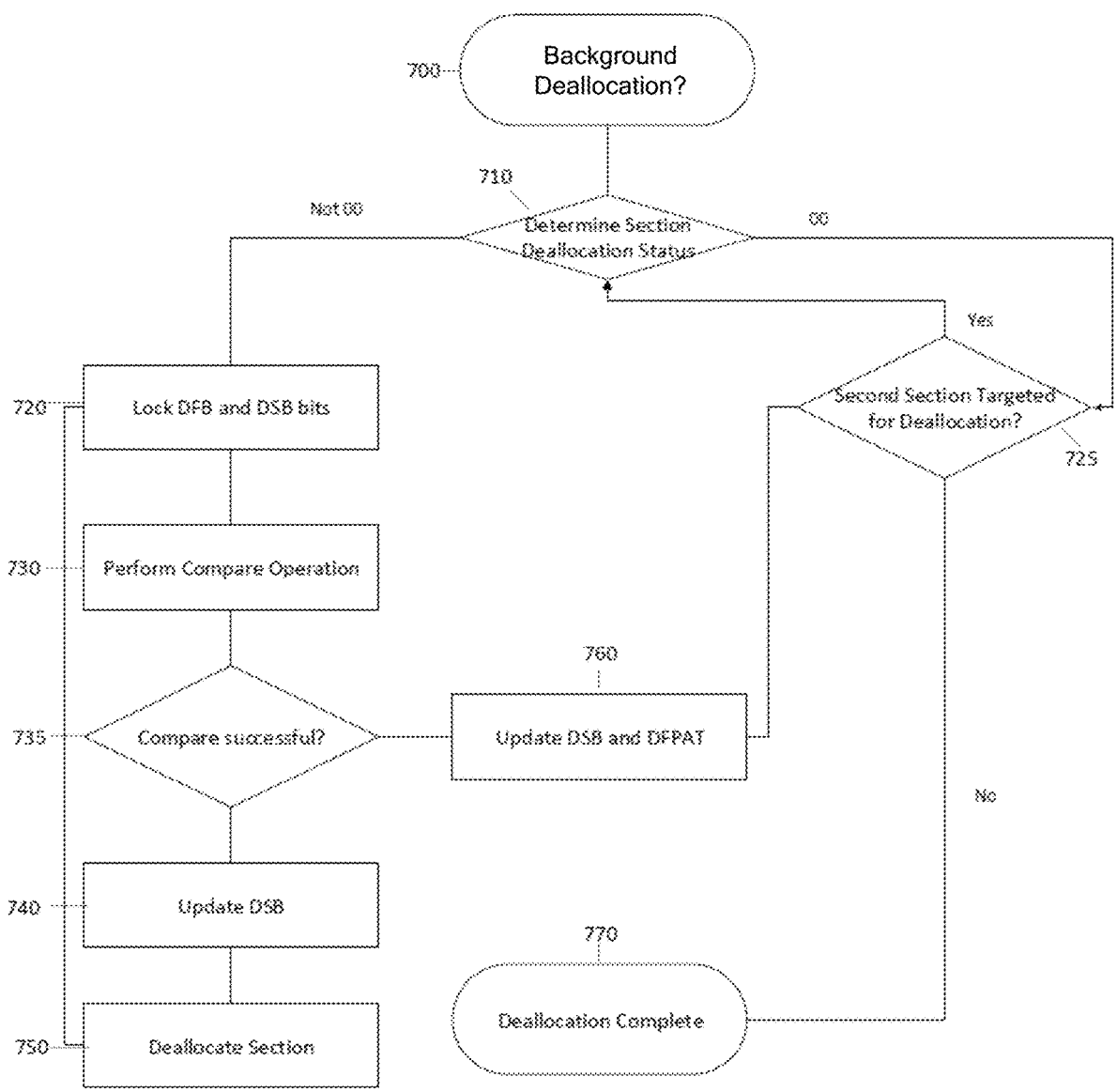
FIG. 7 illustrates background data deallocation in accordance with certain embodiments of the present invention.

FIG. 7 illustrates the process for handling background deallocation according to some embodiments of the present invention.

First, at Step 700, the SSD determines that it needs to perform background deallocation. A background deallocation is triggered when host sends a deallocate command to a range of LCAs in the SSD. In response to the host deallocate command, the Deallocate Summary bits in the Deallocate Summary Table for the corresponding sections and Deallocate flag bitmap for the corresponding regions are set. This in turn triggers the background deallocation. The background deallocation process could target areas of the SSDs corresponding to one section of the deallocate flag bitmap or a plurality of sections depending on the Deallocate summary bits set during the processing of the host deallocate commands.

Then, at Step 710, the deallocation status of the first section subject to background deallocation. If the status of section in the deallocate summary table indicates that the section has been unmapped in the mapping table or background deallocation has already finished for the entire section (e.g., a status of 00 as described above), then process will proceed to step 725.

However, if any other valid status is found (e.g., 01 or 11 from the examples described above), then the process will proceed to step 720.

At Step 720, the deallocate flag bitmap region entries and deallocate summary table section entry corresponding to the section at issue are locked. The lock will prevent any write or deallocation commands from changing these bit inappropriately and prevent any race conditions where other commands try to access the same section at the same time.

Then, at Step 730, memcmp/DMA compare is done between deallocate flag bitmap section and a deallocate zero bitmap. The deallocate zero bitmap is the size of one section of the deallocate flag bitmap and contains all zeros. A skilled artisan will understand that what the default value of the deallocate zero bitmap is depends on the implementation of the process and an all-zero deallocate zero bitmap is merely an illustrative example.

At Step 735, it is determined if the compare was successful. If the compare operation succeeds, the deallocate flag bit map regions have actually already been cleared to their default value (e.g., all zeros) and the process continues to Step 760.

At Step 760, the entries in the deallocate summary table and DFPAT corresponding to the section subject to background deallocation are updated to reflect that the section had already been deallocated. Further, the lock established in Step 720 is released. In some embodiments, the dirty flag bit or other indicator that the sections has not been hardened are reset. In these embodiments, this allows the system to identify if a section, even if dirty, does not need to be hardened because it can be reconstructed using the deallocate summary table as described above. After the update is complete, the process proceeds to Step 725.

However, if the compare is not successful the section has not been fully deallocated yet. That is, only part of the section at issue has been deallocated and contains mixed data wherein entries for different regions in the deallocate flag bit map corresponding to the region have different values. At this point, the process proceeds to step 750, removes the lock set in Step 720, and the deallocate summary table is updated to indicated that the deallocation is in progress. As part of the background deallocation process, the corresponding section is unmapped from the mapping table. Often, the background deallocation and unmapping process is done on a region by region, rather than section wide basis, but this is not always the case.

Once the background deallocating process for the section is complete, the process returns to Step 720 and reimplements the lock so that it can be safely confirmed, using the compare with deallocate zero bitmap process, that background deallocation was successful.

Ideally, this will result in the process ultimately reaching Step 725. At Step 725, it is determined whether there are any other sections that are the target of the background deallocation process. If there are, the process returns to step 710 and starts over for the next target section.

However, if there are no more target sections, then the process ends at Step 770 where deallocation is complete and any secondary tasks, such as sending and acknowledgment of completion or the like can take place.

A skilled artisan would understand that many of the foregoing process do not have to be all employed together to achieve some the crucial benefits of the invention. For example, the benefits of using the deallocate summary table as part of processing read and write commands can be implemented without applying the same to power loss protection and/or boot-up processes. A skilled artisan would thus realize there are many different way to implement the invention with some or all of the aspects described above.

Other objects, advantages and embodiments of the various aspects the certain embodiments described herein will be apparent to those who are skilled in the field of the invention and are within the scope of the description and the accompanying Figures. For example, but without limitation, structural or functional elements might be rearranged consistent with the certain embodiments described herein. Similarly, principles according to the certain embodiments described herein could be applied to other examples, which, even if not specifically described here in detail, would nevertheless be within the scope of certain embodiments described herein.

Further, a skilled artisan would understand that certain aspects of this invention, such as the various controllers, may be implemented as hardware, software, firmware or a combination thereof. The descriptions of such elements in certain embodiments described herein are not intended to limit the implementation of these types of elements to a singular implementation. A skilled artisan would appreciate that there are number ways to implement certain elements of certain embodiments described herein without departing from the spirit of the invention itself.

Additionally, elements reference throughout certain embodiments described herein can be divided into certain sub-elements, combined, or duplicated without departing from the spirit of the invention.

What is claimed:

1. A method of managing a Solid State Drive (SSD), the method comprising:
    storing data in a plurality of regions of the SSD;
    setting a deallocation status of each of the plurality of regions in a deallocate flag bitmap;
    setting a deallocation status of one or more sections of the deallocate flag bitmap in a deallocate summary table, wherein each of the one or more sections corresponds to more than one of the plurality of regions, and
    the deallocate summary table is stored in a first volatile memory, different from a second volatile memory.

2. The method of claim 1, wherein each of the regions of the plurality of regions is associated with a plurality of logical cluster addresses.

3. The method of claim 1, wherein the deallocate flag bitmap is stored in a second volatile memory, different from the first volatile memory.

4. The method of claim 1, further comprising, in response to shutdown or loss of power, writing to non-volatile memory only sections of the deallocate flag bitmap with a predetermined deallocation status in the deallocate summary table.

5. The method of claim 1, wherein the predetermined allocation status indicates a section is dirty.

6. The method of claim 1, wherein each deallocation status of each of the one or more sections of the deallocate summary is a two-bit status.

7. The method of claim 1, the method further comprising:
updating the deallocation status of a region of the plurality of regions in response to one of a deallocation command, a beginning of a background deallocation process for the region, or a completion of the background deallocation process for the region.

8. The method of claim 7, the method further comprising:
updating the deallocation status of a section comprising the region in response to updating the deallocation status of the region.

9. The method of claim 1, wherein the first volatile memory is DRAM.

10. The method of claim 1, wherein the second non-volatile memory is SRAM or DTCM.

11. The method of claim 1, the method further comprising:
setting an entry in a deallocate flag address pointer table based on the deallocation status of a section of the one or more sections of the deallocate flag bitmap corresponding to the entry.

12. The method of claim 1, the method further comprising:
setting an entry in a deallocate flag pointer address table based on the deallocation status of a subset of a plurality of regions corresponding to the entry.

13. The method of claim 1, the method further comprising:
storing an entry in a deallocate flag pointer address table, wherein the entry is either a valid pointer or a predetermined value based on the deallocation status of a section, associated with the entry, of the one or more section of the deallocate flag bitmap; and
in response to a restoration of power event, loading from the non-volatile memory only sections of the deallocate flag bitmap associated with a valid pointer.

14. A Solid State Drive (SSD), the SSD comprising:
non-volatile memory comprising a plurality of non-volatile memory dies;
a first volatile memory;
a second volatile memory; and
a controller, wherein the controller is configured to:
store data in a plurality of regions of the SSD;
set a deallocation status of each of the plurality of regions in a deallocate flag bitmap;
set a deallocation status of one or more sections of the deallocate flag bitmap in a deallocate summary table, wherein
each of the one or more sections corresponds to at more than one of the plurality of regions, and
the deallocate summary table is stored in a first volatile memory.

15. The SSD of claim 14, wherein each of the regions is associated with a plurality of logical cluster addresses, the plurality of logical cluster addresses each associated with a media cluster address of the plurality of non-volatile memory dies.

16. The SSD of claim 14, wherein the controller is further configured to, in response to shutdown or loss of power, write to non-volatile memory only sections of the deallocation flag bitmap with a predetermined deallocation status in the deallocate summary table.

17. The SSD of claim 14, wherein the deallocate flag bitmap is stored in a second volatile memory, different from the first volatile memory.

18. The SSD of claim 14, wherein the predetermined allocation status indicates a section is dirty.

19. The SSD of claim 14, wherein each deallocation status of each of the one or more sections of the deallocate summary is a two-bit status.

20. The SSD of claim 14, wherein the controller is further configured to:
update the deallocation status of a region of the plurality of regions in response to one of a deallocation command, a beginning of a background deallocation process for the region, or a completion of the background deallocation process for the region.

21. The SSD of claim 20, wherein the controller is further configure to:
updating the deallocation status of the section comprising the region in response to updating the deallocation status of the region.

22. The SSD of claim 14, wherein the first volatile memory is DRAM.

23. The SSD of claim 14, wherein the second volatile memory is SRAM or DTCM.

24. The SSD of claim 14, wherein the controller is further configure to:
set an entry in a deallocate flag address pointer table based on the deallocation status of a section of the one or more sections of the deallocate flag bitmap corresponding to the entry.

25. The SSD of claim 14, wherein the controller is further configured to:
set an entry in a deallocate flag pointer address table based on the deallocation status of a subset of a plurality of regions corresponding to the entry.

26. The SSD of claim 14, wherein the controller is further configured to:
store an entry in a deallocate flag pointer address table a deallocate flag pointer address table, wherein the entry is either a valid pointer or a predetermined value based on the deallocation status of a section, associated with the entry, of the one or more section of the deallocate flag bitmap; and
in response to a restoration of power event, load from the non-volatile memory only sections of the deallocate flag bitmap associated with a valid pointer.

* * * * *